(12) United States Patent
Meier (10) Patent No.: US 9,789,768 B1
(45) Date of Patent: Oct. 17, 2017

(54) FULL-SEGREGATED THRUST HYBRID PROPULSION FOR AIRPLANES

(71) Applicant: Wendel Clifford Meier, Waianae, HI (US)

(72) Inventor: Wendel Clifford Meier, Waianae, HI (US)

( * ) Notice: Subject to any disclaimer, the term of this patent is extended or adjusted under 35 U.S.C. 154(b) by 67 days.

(21) Appl. No.: 14/999,343

(22) Filed: Apr. 25, 2016

Related U.S. Application Data (60) Provisional application No. 62/231,481, filed on Jul. 6, 2015.

(51) Int. Cl.

| | | |
|---|---|---|
| *B60L 1/00* | (2006.01) | |
| *B60L 3/00* | (2006.01) | |
| *H02G 3/00* | (2006.01) | |
| *B60L 8/00* | (2006.01) | |
| *B64C 39/02* | (2006.01) | |
| *A63H 27/00* | (2006.01) | |
| *B64C 31/02* | (2006.01) | |
| *B64C 35/00* | (2006.01) | |
| *B60L 11/18* | (2006.01) | |

(52) U.S. Cl.
CPC .............. *B60L 8/003* (2013.01); *A63H 27/02* (2013.01); *B60L 11/18* (2013.01); *B64C 31/02* (2013.01); *B64C 35/00* (2013.01); *B64C 39/024* (2013.01); *B64C 2201/042* (2013.01)

(58) Field of Classification Search
USPC .......................................... 307/109; 244/7 R
See application file for complete search history.

(56) References Cited

U.S. PATENT DOCUMENTS

| | | | | |
|---|---|---|---|---|
| 9,102,326 | B2* | 8/2015 | Anderson | B64D 27/24 |
| 9,174,741 | B2* | 11/2015 | Suntharalingam | B64D 27/02 |
| 9,212,625 | B2* | 12/2015 | Shelley | F02K 5/00 |
| 9,688,397 | B2* | 6/2017 | Smith | B64C 29/0033 |
| 2008/0184906 | A1* | 8/2008 | Kejha | B64C 39/024 |
| | | | | 102/374 |
| 2010/0107651 | A1* | 5/2010 | Hyde | F02C 6/00 |
| | | | | 60/784 |
| 2012/0209456 | A1* | 8/2012 | Harmon | B64C 39/024 |
| | | | | 701/3 |
| 2013/0026304 | A1* | 1/2013 | Wang | B64C 29/0033 |
| | | | | 244/7 R |

(Continued)

FOREIGN PATENT DOCUMENTS

JP        2014137365 A  *  7/2014

*Primary Examiner* — Adam Houston (57) ABSTRACT

An airplane, which includes an airframe and a full-segregated thrust hybrid propulsion system mounted on the airframe. The propulsion system includes: one or more sustainer thrust producers; a plurality of electrically powered thrust producers disposed in predetermined positions as a means for providing additional thrust to the airplane, and to supplement airflow over the wings, flaps, and roll control devices of said airplane; whereby increasing the lift of the wing surfaces and providing enhanced control in the roll axis. The trust producers operate independently from one another, with no aerodynamic, electrical or mechanical inter-connection. Safety is enhanced by the ability of either the sustainer thrust producer(s), or the electrically powered augmentation thrust producers to sustain flight to a suitable landing area, should the other system fail.

9 Claims, 4 Drawing Sheets

(56) References Cited

U.S. PATENT DOCUMENTS

| | | | |
|---|---|---|---|
| 2014/0339367 A1* | 11/2014 | Sankrithi | B64C 30/00 244/135 R |
| 2015/0096300 A1* | 4/2015 | Gurin | F01K 23/10 60/645 |
| 2015/0144742 A1* | 5/2015 | Moxon | B64D 27/12 244/215 |
| 2016/0185459 A1* | 6/2016 | Kiefer | B64C 39/024 244/54 |
| 2016/0200436 A1* | 7/2016 | North | B64C 29/0033 244/7 R |
| 2016/0229532 A1* | 8/2016 | Shapery | B64C 29/0075 |
| 2016/0244158 A1* | 8/2016 | Fredericks | B64C 25/52 |
| 2017/0029131 A1* | 2/2017 | Steinwandel | B64D 35/08 |
| 2017/0190436 A1* | 7/2017 | Ullman | B64D 27/24 |
| 2017/0197700 A1* | 7/2017 | Wainfan | B64C 3/32 |

* cited by examiner

FULL-SEGREGATED THRUST HYBRID PROPULSION FOR AIRPLANES

CROSS-REFERENCE TO RELATED APPLICATIONS

This application claims the benefit of U.S. Provisional Patent Application 62/231,481, entitled, "Full-Segregated Thrust Hybrid Propulsion for Airplanes", filed by Wendel C. Meier on Jul. 6, 2015, such application being incorporated herein in its entirety by reference.

1. Field of the Invention

The invention pertains to aviation, and in particular to airplanes and the enhancement of airplane performance, control and safety by applying the attributes available through full-segregated thrust hybrid propulsion to the current state of the art, thus expanding the operational envelope of the airplane, while enhancing safety.

2. Description of the Prior Art

"An airplane is merely a bunch of compromises, flying in close formation."—Author unknown.

An airplane, to be successful must operate efficiently in several regimes: Take off; Climb; Cruise; Descent; Approach and Landing. Each regime has different thrust requirements which the designer must accommodate. Previously, one or more variable power sources have been used to provide the thrust requirements by adjusting the power of the Internal Combustion Engines (ICE), and varying the pitch of propellers, or thrust of turbines. This approach is heavy, complex, expensive, and is lacking in reliability and efficiency. The rule of thumb for aircraft design is that the thrust available for take off must equal at least one third of the aircraft's Maximum Take Off Weight (MTOW). For example, a Boeing 737 sized aircraft with a Maximum Take-off Weight (MTOW) of 150,000 pounds will require at least 50,000 pounds of thrust for normal take off performance. For Short Take Off and Landing (STOL) operations, the thrust should approach the MTOW. This requires large, heavy Internal Combustion Engines (ICEs) which are then not very efficient in cruise flight. Therefore, this level of thrust for take-off and climb has not previously been available for commercial STOL operations.

Full-Segregated Thrust Hybrid Propulsion for Airplanes, proposes the application of a combination of ICE and Electric Motors (EMs) to provide the required thrust for the airplane during take-off and initial climb, with each power system designed to exploit its attributes. When the aircraft is established in the cruise portion of the flight, the EMs are stopped, the propellers either feather, or fold, and the flight continues under the power of the ICE(s) alone. The EMs are almost instantly available for any situation requiring their use.

The prior art, designed to reduce the gap between required take off thrust and required cruise thrust by the use of electric hybrid power systems mostly fall into two groups: Serial Hybrid; and Parallel Hybrid power systems. Serial Hybrids Systems are pretty much non starters for aircraft. Series hybrid configurations include large associated weight penalties, and may not be effective due to large power losses.

That leaves Parallel Hybrid Systems, for example the following patents: "US 20120209456 A1, CLAIMS:
1. An unmanned air vehicle, comprising:
an airframe; and a parallel hybrid-electric propulsion system mounted on the airframe, the parallel hybrid-electric propulsion system including:
an internal combustion engine; an electric motor; a hybrid controller, the hybrid controller configured to control both the internal combustion engine and the electric motor; and a mechanical link; and a propeller connected to the mechanical link, wherein the mechanical link couples the internal combustion engine and the electric motor to the propeller to drive the propeller;
US 20080184906 A1, CLAIMS:
1. Parallel internal combustion-electric hybrid propulsion system for airplanes, comprising:
a smaller internal combustion engine than an internal combustion engine of an equivalent internal combustion-only airplane; an electric motor/generator in one unit; an electric control unit for controlling said motor; an electric clutch between said engine and said motor/generator; at least one battery electrically connected to said motor/generator through said control unit;
a propeller which can be driven by said engine, or by said electric motor, or by both, selectively through said clutch;
U.S. Pat. No. 9,102,326 B2, CLAIMS:
1. A hybrid aircraft propulsion system comprising:
a driveshaft; an internal combustion engine mounted on the driveshaft to provide power for driving an aircraft propeller; an electric motor offset from the internal combustion motor and coupled to the drive shaft to provide power to the aircraft propeller independently of the power supplied by the internal combustion engine; a hybrid assembly interconnecting the internal combustion engine and electric motor to the driveshaft such that the electric motor and internal combustion engine are operable in parallel to power the propeller independently, the hybrid assembly comprising a hybrid clutch attached to a first sheave mounted along the driveshaft, and disposed between the first sheave and the internal combustion engine, and a second sheave driven by the electric motor and coupled to the first sheave so as to translate power from the electric motor to the drive shaft through operation of the hybrid clutch; wherein the first and second sheaves are different in size;
WO 2014137365 A1, CLAIMS:
1. A hybrid aircraft propulsion system comprising:
a driveshaft; an internal combustion engine mounted on the driveshaft to power an aircraft propeller; an electrical motor that operates the aircraft propeller independently of the internal combustion engine; a hybrid assembly interconnecting the internal combustion engine and electric motor to the driveshaft such that the electric motor and internal combustion engine operate in parallel to power the propeller independently;
WO 2014131914 A1, CLAIMS:
1. ELECTRIC AUXILIARY POWER SYSTEM FOR AIRCRAFT piston engine, comprising:
Combustion engine (107)
Motor-generator-electric starter (105) connected to the combustion engine, where the motor-generator-electric starter starts the combustion engine and where the motor-generator-starter is driven by the combustion engine to generate electricity, which It is stored in the battery;
Battery (101)
Control system of charging and discharging of the battery (102)
Electronic control system (103)
Indication and control system in the cabin (104)
Propeller (108) directly connected to the motor-generator-electric starter
A clutch (106) connected between the motor-generator-electric starter and the main motor."

The above patents, as shown in bold type, address parallel hybrid power plants for airplanes which have the internal combustion engine and electric motor coupled by a system of shafts, clutches, and transmissions to a rotating shaft driving a single propeller to generate thrust. The ICE can be down sized from the one third rule by using battery power to drive the EM during the take-off and climb regime, thus gaining additional thrust. The battery is then typically recharged during the cruise portion of the flight.

Full-Segregated Thrust Hybrid Propulsion for Airplanes is much simpler as compared to the bold type high lighted statements in the claims above and, has fewer parts, weighs less, and is more efficient. There are additional aerodynamic advantages to segregating the thrust of each propulsion unit, especially for STOL aircraft, in that the electric propulsion units can be positioned to supplement air flow over the wings, flaps and ailerons of the aircraft to augment low airspeed lift and control.

Like the above listed patents, all of the hybrid propulsion systems found to date are either serial or parallel systems. The following describes the various classes of hybrid propulsion.

"Hybrid Systems Defined:
A hybrid vehicle is a vehicle that uses two or more distinct power sources to move the vehicle. The term most commonly refers to hybrid electric vehicles (HEVs), which combine an internal combustion engine (ICE) and one or more electric motors (EM);
A series hybrid vehicle uses an internal combustion engine to drive a generator which supplies electrical power to one or more electric motors. The most common example is the diesel electric railroad locomotive;
A parallel hybrid vehicle has an internal combustion engine, and an electric motor and battery used in combination. Both ICE and EM may drive the vehicle at the same time, or independently through a system of clutches and transmissions. Kinetic energy may be used to recharge the battery through a motor/generator, or separate generator, or the batteries may be recharged by the ICE driving a generator;
A full-parallel hybrid vehicle simply means the vehicle may be propelled for a substantial distance by either source, independently."
—Wikipedia.

The Full-Segregated Thrust Hybrid Propulsion for Airplanes is unique and does not fall into any of the series or parallel categories above, since there is no mechanical or aero-dynamic coupling between the ICE or EM components. Although the total system is a hybrid, each trust generator is completely independent with its own fossil fuel, or electrical power supply. Therefore, I have created a separate hybrid category for this vehicle as shown below:

A Full-Segregated Thrust Hybrid Propulsion System for Airplanes has one or more sustainer internal combustion engines (ICEs), and two or more augmenter electric motors (EMs) each driving its own propeller, There is no mechanical or aerodynamic coupling between the ICE and EM thrust producers. They are typically sized so that either thrust source, ICE or EM, can independently sustain the flight of the airplane to a safe landing area."
—W. C. Meier.

This independence of thrust generation enhances safety in the event of failure of one of the systems.

The advantages of this illustrative embodiment of the invention in a small unmanned air vehicle (sUAS) described below, over the previous art are several.

Simplicity, eliminating the drive shafts, clutches and transmissions, as well as the controls for them that parallel hybrid embodiments require, reduces complexity, weight, and improves reliability.

Systems, the use of battery power, without recharging, eliminates most Electro Magnetic Interference (EMI) noise from the control electronics and payload. Lithium-Poly (Li-Po) batteries currently provide the highest power density available, along with high current discharge rates, however these high discharge rates heat the battery significantly. If these batteries are recharged while hot it can damage the battery, and may even cause a fire. Before deciding on adding an electrical generator and battery charger to the system, the designer must weigh the increased weight of the components against the battery weight they may save. Li-Po batteries, unlike NiCad or NiMH batteries are not easily recharged. They require special chargers to maintain balance between all cells, or damage may occur to the battery. Charging Li-Po batteries is best accomplished under supervision, on the ground. Therefore, it is best not to recharge the batteries in flight. The battery compartment is designed to accommodate the largest battery of intended use. Batteries for each flight must be selected for the mission profile requirements. When the aircraft lands to refuel, the batteries are then replaced with fresh, cool, properly recharged batteries. Usually the payload batteries, and digital recording medium will be replaced at this time as well.

"Simplicate and add lightness." [sic]—Ed Heinemann, Douglas Aircraft, designer of the A4D and other aircraft.

Propellers, one of the main attributes of the Full Segregated Thrust Hybrid Propulsion System for Airplanes over the prior art, is the ability to select fixed pitch propellers for their primary intended flight regime. Most of the prior art channels the energy from the ICE and EM into a single propeller, which then must have adjustable pitch in the air, or be a compromise between take off and cruise when a fixed pitch propeller is selected. Firstly, this invention uses at least three fixed pitch propellers greatly increasing propeller disc area, thus enhancing efficiency in the low speed regime. Secondly, each fixed pitch propeller is selected for its primary purpose. While the ICE propeller(s), optimized for cruise, give up some efficiency in the take-off regime, this is more than compensated for by the EM propellers, which are selected for the low speed take off and climb regime. Once established in cruise, the EMs are stopped and propellers feathered, or folded for the cruise regime to reduce aerodynamic drag. The EM propellers are selected from a group of propellers having large diameter and low pitch for increased efficiency in the take-off and initial climb regime. This also provides copious amounts of additional airflow over the wings, flaps and roll control devices to increase lift and enhance roll control at low airspeeds.

Aerodynamics, during STOL operations flight control is paramount to success. The EM driven, counter rotating, tractor propellers directing airflow over the wings, flaps, and aileron control surfaces enhance slow speed control, as well as increasing lift during the take off and landing phase of flight. Also, the use of feathering, or folding propellers reduces drag when the EM thrust system is not in use.

Vibration, is mitigated by the reduction in size and weight of the ICE, since it only needs to produce sufficient thrust for the cruise regime. Also, the ICE can be optimized to run in a narrow band of RPMs, thus enabling more effective vibration mitigation by isolation dampening tuned to the frequencies generated during the cruise regime. Vibration mitigation is accomplished in two phases, first by isometric motor mounts between the engine and firewall, and second by Lord mounts isolating vibrations between the fuselage and payload.

Safety, is enhanced by the availability of the EM powered thrust generators that can sustain flight in the event the ICE should fail. The EMs may not have sufficient endurance to complete the mission, however they will provide sufficient flight capability to reach a suitable landing area. This is very important for in many cases the payload is more valuable than the flight vehicle. Reliability of the vehicle to safely return the payload to the customer is paramount.

"The best airplane is the least airplane that will adequately do the job."

—James Thorp, aircraft designer.

What need does this invention fill? First a bit of history on the prior art of Unmanned Air Vehicles (UAVs). Until recently, most UAVs were used by the military. The cellular telephone changed that. How so? The technology of Miniature Electro Mechanical Systems (MEMS), including gyros, accelerometers, magnetometers, barometric altimeters, and GPS components small enough and inexpensive enough to be incorporated in cell phones opened the way for civilian UAVs. Along came the Rotor Drone, which had hardly existed prior to 2009 and is currently the largest selling recreational model aircraft. It is magnificent. It is simple to operate, requires no conventional pilot skills, and can do many useful jobs. Speed and endurance are its major limitations. Typically, 40 MPH is about its speed limit and forty minutes its endurance limit.

The other popular small UAVs are light weight, electrically powered, hand launched airplanes. They are more efficient than the rotor drones, however their endurance limit is typically 60 minutes. Of course, both are very limited in payload capacity, usually carrying only one Go Pro camera, or equivalent.

At the other end of the endurance spectrum are military UAVs with 24 or more hours of endurance. Typically, they are catapult launched, and belly landed. Most have no landing gear; one system, In-Situ's, Scan Eagle, snags a vertical bungie cord with a wing tip hook to arrest the landing. These launch and recovery systems are huge in comparison to the size of the aircraft, complicated, and expensive.

Full-Segregated Thrust Hybrid Propulsion for Airplanes is designed to fill a need not addressed by the prior art; this requires substantial original thought and innovation. The main areas of innovation are:

Payload weight needs to be increased to accommodate current technology in FLIR; Magnetometers; Multi-Spectral Imagers; SAR; and LIDAR, most of which can be in packages weighing about 10 pounds. This pretty well rules out rotor drones and small hand launched airplanes.

Endurance will need to be increased to four hours with reserves, in order to accomplish the mission with minimum refueling stops. This will mean the MTOW will be about 30 pounds, which precludes hand launching. Catapults are not a practical alternative, and belly landings are not a very elegant option for arrival. Both can be detrimental to the payloads. A safer and more elegant solution is a Short Take Off and Landing (STOL) airplane, with sprung landing gear and large air inflated tires. This will be easier on both the payload and the airframe. But how to power this STOL airplane? A single large 80 cc internal combustion engine could provide sufficient thrust, however the vibration it would generate would be unacceptable. Also, the single fixed pitch propeller could not be optimized for cruise, it would have to be a compromise. Enhanced flight control at low airspeed is a requirement for STOL operations, and the single engine provides no roll control augmentation by directing airflow over the ailerons. The solution is the Full-Segregated Thrust Hybrid Propulsion for Airplanes, described below, which combines the attributes of a relatively small ICE, providing long endurance, selected and tuned for the cruise regime, along with multiple EMs optimized for the take-off, climb, and approach and landing regimes. For the cruise regime the EMs are stopped and the propellers feathered, or folded for drag reduction. The EMs are, of course, immediately available should they be needed.

SUMMARY OF THE INVENTION

The FAA NPRM, recently released, defines a small Unmanned Air System (sUAS) as an aircraft with an Maximum Take Of Weight (MTOW) of less than 55 pounds, a maximum speed of less than 100 Miles Per Hour (MPH), to be flown at an altitude of less than 500 feet Above Ground Level (AGL). A vehicle within these limitations will have many applications in geophysical survey work, as well as agriculture, pipeline, and power-line imaging with the HD video, geo-referenced photo matrixes, thermal imaging, LIDAR, SAR, magnetometer, and the multi-spectral devices currently available. The successful aircraft will have, at least, the following attributes:

long endurance, typically four hours with reserves, to enable the aircraft to cover a large survey area, cost effectively, between refueling;

low vibration engines that also have a low "electromagnetic signature," so as not to disturb the sensitive measurements being made;

ability to fly autonomously on a smooth and well controlled flight path, to minimize the overlap required between scan lines and maximize measurement accuracy;

consistent high reliability of aircraft and systems;

ability to take-off and land from unpaved air-strips, or roads;

accommodate many different sensors in the payload bay;

provide for gyro stabilized manual, and autopilot flight modes.

Hence, the Full-Segregated Thrust Hybrid Propulsion STOL Airplane. A combination of electric and internal combustion propulsion provides the best of both technologies. Battery technology has come a long way in this decade, but cannot compete with the power density of internal combustion engines and fossil fuels. Electric propulsion is reliable, easy to start and stop, and capable of providing high thrust levels for short durations. The marriage of these two technologies provides the required high thrust performance for take-off and climb, while the internal combustion engine provides the long endurance propulsion for cruise and loiter.

The Vision:

An STOL airplane powered by one or more internal combustion engines sized to the requirement for cruise thrust. Since it will be running in a narrow band of RPMs, it can be tuned for maximum efficiency at one RPM and power setting.

In addition, the airplane will have an electrically powered thrust system that is comprised of two, or more, electric motors (EM), two, or more, Electronic Speed Controls (ESCs) and a battery system capable of high discharge rates. Folding or feathering propellers are included to reduce aerodynamic drag when the electric propulsion system is not in use. Counter rotating propellers are preferred to reduce yaw effects with pitch changes.

The combined thrust of both internal combustion and electric sources could exceed the gross weight of the aircraft, allowing near vertical take-offs without ground equipment such as catapults. At MTOW, a short ground run and steep climb out will allow use in off airport situations, such as take-offs and landings from a road.

Once the desired cruise level and speed is reached, the electric motors are stopped, the propellers are feathered, or folded to reduce drag.

Safety is enhanced by the availability of the electrical propulsion system, which is completely independent from the internal combustion propulsion system, should the latter fail in flight. While there may not be sufficient endurance to complete the mission with electric propulsion, there should be adequate endurance to make a controlled emergency landing to a suitable area.

This would constitute a full-segregated thrust hybrid electric/internal combustion engine system, that would use the attributes of each technology to meet a specific design goal.

BRIEF DESCRIPTION OF THE DRAWINGS

The accompanying drawings which are incorporated in and constitute a part of this specification, illustrate embodiments of the invention and, together with details given in the "Structure of the Invention" and "Operation of the Invention" included below, serve to explain the assembly and operation of the invention.

DETAILED DESCRIPTION OF THE INVENTION

This invention, of a full-segregated hybrid propulsion system for airplanes consists of an airframe, and mounted on the airframe a segregated thrust hybrid propulsion system consisting of one or more sustainer thrust producers. The sustainer thrust producers may consist of internal combustion piston or turbine engines driving propellers, fuel cell or photo voltaic powered electric motors driving propellers, or turbo-jet engines, and; a plurality of electrically powered augmentation thrust producers disposed in predetermined positions as a means for providing additional thrust to the airplane, and to supplement airflow over the wings, flaps, and roll control devices of said airplane; whereby increasing the lift of the wing surfaces and providing enhanced control in the roll axis. The electrically powered augmentation thrust producers are comprised of a chemical battery, or other electrical power source, connected to an electronic speed control (ESC), which is connected to an electric motor. The electric motor is connected to a propeller, The propeller is selected from a group consisting of propellers of various diameters, and pitch to optimize the performance of the applicable flight regime. The selected propeller may either feather, or fold thereby reducing aerodynamic drag when not in use. The propellers may be counter rotating thereby canceling "P" factor, and enhancing flight qualities through reduction of pitch and yaw coupling.

The full-segregated hybrid propulsion system for airplanes is unique to the previous art in that segregating the thrust and distributing the airflow over various parts of the airplane allows the aerodynamic designer more latitude in optimizing the aerodynamic performance of the airplane. The enhanced airflow over the wing, flaps and roll control devices improves the lift of the wing, and effectiveness of roll control at the low airspeeds encountered in STOL operations.

Most cited references to parallel hybrid propulsion systems use a system of drive shafts, clutches and transmission, as well as the controls for them, to direct the power to a single propeller. This increases complexity, adds weight, and reduces reliability. This invention distributes the power to three or more propellers, sited optimally on the airframe, and greatly increasing the total propeller disc area for improved acceleration, take-off, and climb efficiency, This allows the designer to position the propeller slip streams where it will be advantageous for generating increased lift and flight control response at low forward airspeeds. The EM driven propellers can be stopped when no longer needed, and the propellers will automatically fold, or can be feathered to reduce drag.

The rule of thumb, that the thrust should equal one third of the gross weight of the aircraft for reasonable performance, no longer applies to the sustainer engine, whether it be a fossil fuel burning ICE, fuel cell or photo-voltaic powered EM, or whatever the future holds. The full segregated thrust hybrid power system's EMs fulfill this requirement. Therefore the sustainer engine can be sized to accommodate the requirements for cruise thrust and electrical generation requirements only. This allows the designer to reduce the size of the sustainer engine substantially, tune the engine and, if fitted, the propeller for optimum cruise performance therefore enhancing efficiency.

Safety, is enhanced by the availability of the EM powered augmentation thrust generators that can continue the flight in the event the sustainer engine should fail. The EMs may not have sufficient endurance to complete the mission, however they will provide sufficient flight capability to reach a suitable landing area. In conclusion, this invention is an improvement over previous art in the areas of safety, simplicity, economy, and aerodynamic efficiency.

For this illustrative embodiment we will use the afore mentioned sUAS. Let's first examine power considerations:

Electric motors, what's not to like? They start and stop almost instantly, there are no emissions, or residue on the aircraft, they idle with negative thrust for descent and landing, and they are quiet. However, they need voltage to run, and that is currently a severe limitation. The power density of chemical batteries cannot approach that of the fossil fuel for internal combustion engines; at least not yet. Electric motors excel in applications requiring high power for short duration, so that is where we will use them.

Airplanes require much more power for take-off and climb than for cruise, especially for Short Take-Off and Landing (STOL) operations. For this example, we will use 30 pounds as the Maximum Take-off Weight (MTOW). The rule of thirds, that thrust should equal one third of the aircraft weight, is viable for normal operations from a runway. However, for STOL operations from unimproved ground, requires the thrust to weight ratio to be nearly equal. Two electric motors (EM), each generating 10 pounds of thrust (Total 20 pounds) for takeoff and climb and one Internal Combustion Engine (ICE) generating 10 pounds of thrust should give the performance required. The two EMs are located, one on each wing in a nacelle containing all the required high current components, including the battery for that EM. Each EM will be fitted with a folding or feathering propeller, pitched and sized for take-off and climb performance. Ideally, the two propellers will be counter-rotating to mitigate "P" Factor, and pitch/yaw interaction. When the throttle is closed, both EMs will use a brake, incorporated in the ESC, to stop the propeller rotation and allow the propellers to fold back or feather reducing drag.

ICEs are problematic. They are noisy, they vibrate, they emit fumes and spray oil, they require a starter to initiate rotation, they have ignition systems which produce EMI, or glow plugs which are unreliable, especially at idle, and they are large and heavy compared to EMs of equal power. They do have one outstanding attribute; they run for as long as they have fuel, and the power density of the fuel is much greater than current battery technology can deliver. For long endurance aircraft there is currently no substitute for ICEs.

Mitigation for some of the problems of ICEs are:

First and foremost, is size. The smaller the ICE the less the problems with weight and vibration. The full-segregated thrust hybrid configuration allows down-sizing the sustainer ICE to that required for cruise. The rule of thirds, no longer applies. Any thrust needed beyond that required for cruise is supplied by the EMs Second is selection of the "Type" of ICE. There are quite a few options which are discussed below:

Two cycle vs four cycle piston engines. Two cycle engines are less efficient in terms of pounds of fuel per pounds of thrust. Four cycle engines weigh more, are more complex, more costly, and produce less power per cubic inch of displacement than two cycle ICEs. In this embodiment, two cycle ICEs were chosen for simplicity and weight, vs fuel efficiency. Also, mitigating vibration is a high priority since most payloads are not vibration tolerant. Four cycle engines vibrate at lower frequencies than two cycle engines, and higher frequencies are easier to mitigate.

"Nitro Fuel", Gasoline, or Diesel all have advantages and disadvantages. Nitro Fuel is expensive, usually contains 20% oil which leaves much residue on the aircraft and may interfere with the payload, and fuel consumption is three times that of a gasoline engine. They also use a glow plug to initiate diesel ignition. This can be problematic in its own right.

Diesel fuel is more fuel efficient, however the fuel still contains 20% oil with the attendant residue problems; and Ether, to help provide compression ignition. Some find the fumes objectionable. The fuel is about the same price as Nitro Fuel, but even more difficult to find. No glow plug is required, however the high compression of diesel ignition increases vibration compared to similar sized ICEs using glow fuel or gasoline.

Jet-A fuel is available at most airports, and can be used with certain additives in small turbojet, and turbo prop engines. Turbine engines are expensive, and not as efficient as piston engines, however their use may be required with some payloads to mitigate vibration.

That leaves gasoline. Unleaded 87 to 91 octane is available almost everywhere, and is relatively inexpensive. It must be mixed with two cycle oil at ratios of 20:1 to 50:1 depending on the manufacturer's recommendation. Even at 20:1, that's 5% vs 20% or ¼ the oil content of nitro or diesel fuels, with similar reduction in residue in the exhaust. For this embodiment, gasoline fuel was chosen.

Ignition systems, there are two for now: Magnetos are self contained, and require no additional power source, however most have a fixed ignition advance. They also have a large EMI footprint, which could be problematic with some payloads. Also, the magneto requires the engine be rotated at a relatively high speed to provide adequate spark for ignition. This requires either an electric ground starter, or spring powered starter increasing complexity. Capacitive Discharge Ignition (CDI) systems require an electrical power source, however they have a throttle advance curve that retards the ignition for low RPM and advances ignition for higher RPM, thereby increasing power and efficiency of the ICE. They are easier to shield for EMI mitigation to the payload. For this embodiment, CDI ignition was chosen. Glow plugs for gasoline engines have just entered the market. Time will tell concerning their reliability. Perhaps, they may be an option for EMF sensitive payloads in the future. Also in the future, fuel cell or photo-voltaic powered thrust producers may become economically feasible and I include them with ICEs as sustainer engines.

VIBRATION MITIGATION: This is extremely important, as many payloads are not vibration tolerant. For example, most digital imaging devices use CMOS based sensors to capture the image. Vibration can cause what is referred to as the "waterfall effect" on video, which when viewed looks remarkably like viewing the video through a waterfall. This distortion makes the image almost useless for Geo Referencing work, and it cannot be "fixed" post production. This vibration must be mitigated to acceptable levels to make the invention useful. For the EMs this is relatively simple. Balancing of the rotating parts, both motor and propeller satisfies the requirement. Usually, the EMs will be stopped and the propellers folded back or feathered during data gathering. ICE vibration mitigation is more problematic. The full-segregated thrust hybrid configuration contributes greatly to the mitigation by reduction in size of the ICE. Also, it allows tuning the ICE to the optimum operational parameters of cruise flight. The exhaust, and engine vibration mounts can be optimized for the operating cruise RPM. Having to mitigate a narrow band of vibration is much easier than a wide band produced by variable RPM and power settings. Also, the two cycle engine was chosen as it is easier to mitigate the high frequency vibrations of the two stroke versus the lower frequency vibrations of the four stroke engine. This embodiment incorporates a two phase mitigation system, one isolating the engine vibrations from the fuselage, and another isolating fuselage vibrations from the payload.

AERODYNAMIC CONSIDERATIONS: STOL airplanes operate in a low airspeed environment during both take off and landing, and require some form of control augmentation to maneuver the airplane successfully. The full-segregated thrust hybrid provides that augmentation in the roll axis by accelerating airflow over the wings, flaps, and ailerons with the wing mounted tractor EMs and large diameter propellers. The center mounted ICE provides airflow to augment the tail mounted controls for yaw and pitch. Gyro/Accelerometer stabilization reduces pilot work load to effect a stabilized take off, and approach and landing. The accelerated airflow over the wings also produce lift with a rearward vector stabilizing the low airspeed, high alpha approach known as a "Harrier Landing"

Alternative Embodiments

Scaleability:

The Full-Segregated Thrust Hybrid Propulsion STOL Airplane is scaleable from the size of Model Airplanes, or small Unmanned Air Systems (sUAS) to the Medium Altitude Long Endurance (MALE) Unmanned Air Vehicle (UAV) class of unmanned airplanes.

Optionally Piloted Airplanes utilizing this technology make sense in larger applications to overcome problems of transporting the vehicle from the maintenance base to the field operation, or from one operating area to the next. The payloads may be, typically, larger than a man so removing the payload and replacing it with the required flight controls and instruments, in modular form, will allow the vehicle to be ferried through the National Airspace System (NAS) airspace just like any certificated aircraft. A restricted category certificate may be all that is required for ferry operations. After arrival at the operational site, and meeting with the ground crew, the vehicle can be reconfigured for the mission. For the larger airplanes, this would take less time, and effort, than disassembling the air vehicle and transporting it via ground vehicle and reassembling it on site.

Once proven, the use of this Full-Segregated Thrust Hybrid Propulsion technology for certificated manned airplanes in the Normal, Utility, Ultra-light and Light Sport Aircraft, in Restricted or Experimental categories is a distinct possibility. A Supplemental Type Certificate (STC) for a Full-Segregated Thrust Hybrid Propulsion modification for a Cessna 185, for example, would provide enhanced STOL performance; and the redundancy of the electric propulsion in the event the ICE fails. This will improve safety. It would be an excellent "Bush Plane" with enhanced performance and safety over the original single engine model.

The availability of the electric augmenter thrust for Light Sport and Ultra-Light aircraft will provide redundancy to the, sometimes less reliable, ICEs that are currently in use. Those very ICEs will, of course, provide the range not currently available under electric power alone.

Gliders can benefit from the EM portion of this technology by utilizing the short duration high thrust capability for self launching, and as an adjunct for extending gliding distance when necessary. Also, the ability to reject a landing when the conditions mandate can greatly increase safety. This is an improvement over the prior art of auxiliary power ICEs with feathering propellers, which are not immediately available to produce thrust on demand. Also, folding propellers typically cause less drag than feathered propeller, and the nacelles for EMs are very slender compared to that of the ICEs, therefore, further reducing aerodynamic drag.

Airplane Configurations

Pusher propellers for the ICE embodiment could be employed when forward looking image scanning is required.

The ICEs could be a piston engine two cycle, or Four cycle, with glo-plug, diesel, or spark plug ignition, using Nitro-Fuel, diesel fuel, or gasoline for driving a propeller to generate thrust. These could be installed in either tractor or pusher configurations. Turbine engines using Jet-A, or equivalent fuel, could be useful where vibration is an issue, either configured as a turbo-prop or turbo-jet engine. The turbo-prop could be used in either tractor or pusher configuration, however the turbo-jet would likely be used only in the pusher configuration. In slightly larger sizes, Wankel engines are becoming available with the advantage of using fossil fuels, and producing less vibration than piston engines. In the near future fuel cell, and/or photo voltaic technology may be available for the sustainer engine, and augmented with the use of proven high current battery power for the EMs.

This illustrative embodiment is for an STOL mono-wing airplane, however the technology works well for conventional take off and landing airplanes, bi-planes, tilt wing and free wing designs. It is not restricted to land planes either, and would be beneficial for seaplanes, flying boats and float planes to enhance performance and maneuverability on the water as well as safety should the ICE(s) fail.

Structure of the Invention

Figure 1:
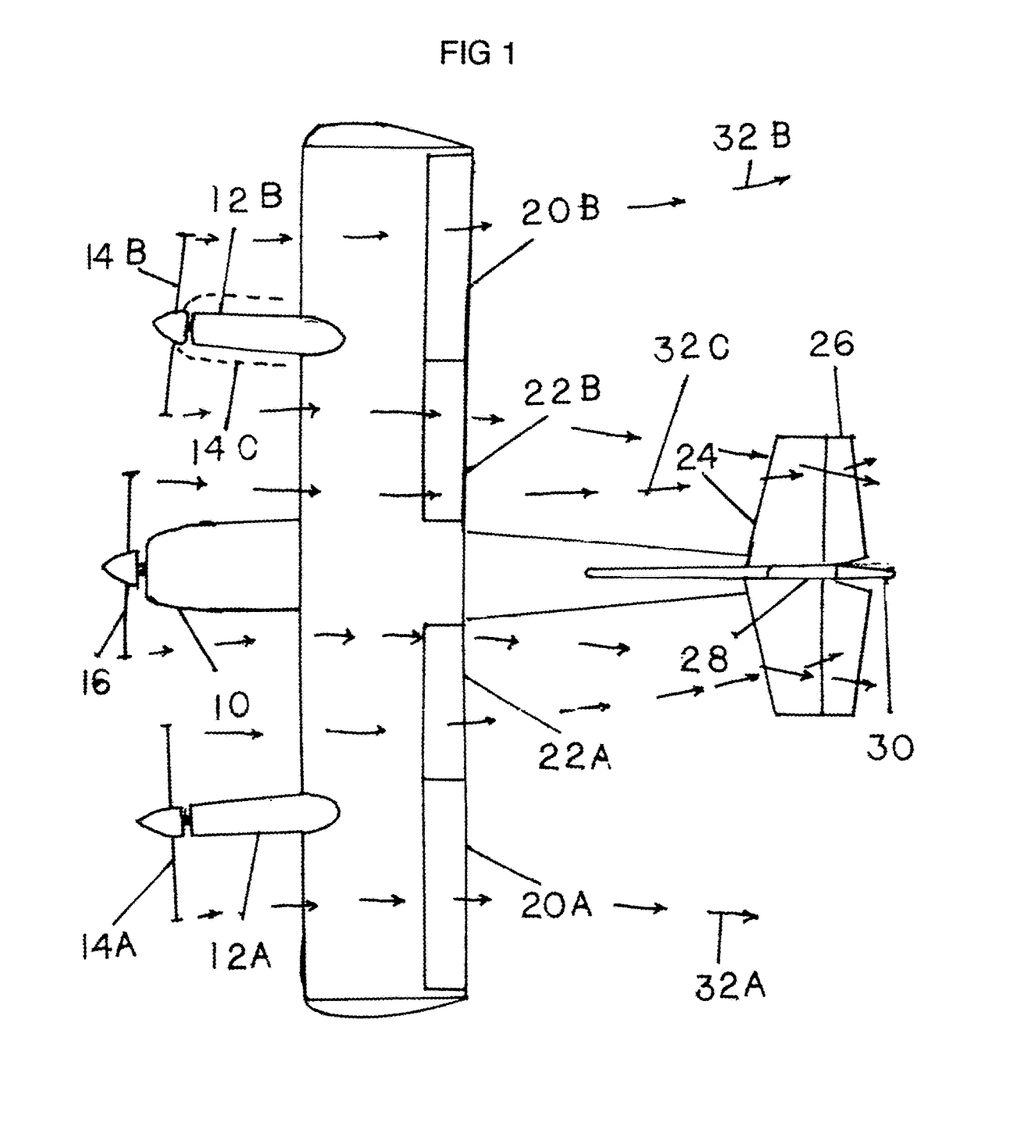
FIG. 1, illustrates the top view of the Full-Segregated Hybrid Propulsion STOL Airplane, and the position of the major components. Also illustrated, are the paths of air flow generated by the thrust producers.
Figure 3:
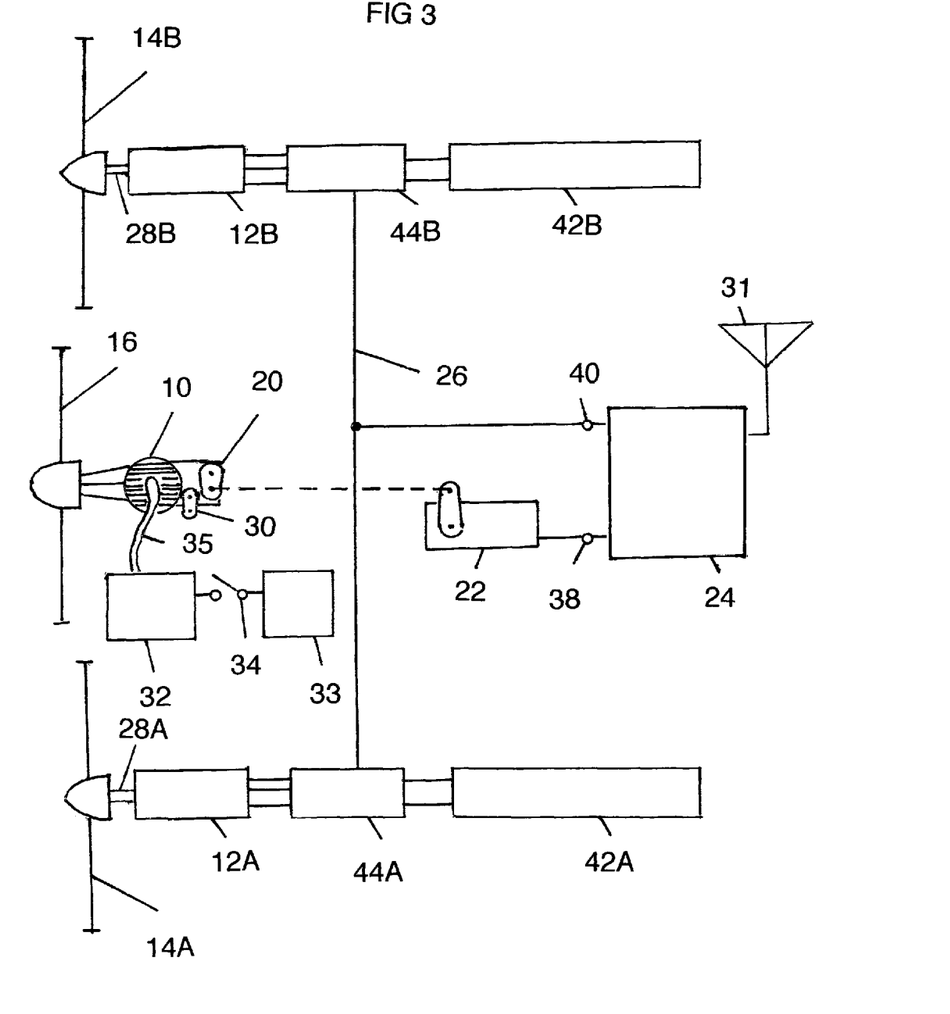
FIG. 3, is a block diagram of the invention, illustrating the ICE, EMs, ESCs, and batteries and their relative positions, and interconnectivity to the radio control receiver, and each other.

FIG. 1, shows the top view of the Full-Segregated Hybrid Propulsion STOL Airplane. The above view differs from many single engine high wing airplanes mainly by the addition of the two nacelles FIGS. 1, 12 A&B each containing an electric motor (EM), an electronic speed control (ESC), and a battery as depicted in FIG. 3. Each nacelle drives a tractor, folding propeller, 14 A&B, which has been selected for the best performance in take off and climb. The dotted line, 14 C shows the position of the propeller when folded. What does not show in the drawing is the reduced size of the internal combustion engine (ICE) in the center engine nacelle, 10 and the pitch of its propeller, 16 both of which are selected for optimum cruise performance. The ICE no longer needs to meet the ⅓ rule, that the thrust must equal ⅓ of the aircrafts Maximum Take Off Weight (MTOW) in order to have adequate performance for take off and climb. The two EMs in the nacelles, 12 A&B now meet that requirement. The arrows, 32A,B, and C indicate the airflow paths from the propellers over the various control surfaces. Arrows 32A&B showing airflow directed over ailerons 20 A&B, and flaps 22A&B, and arrows 32C showing airflow directed over the horizontal stabilizer 24, and elevator 26 as well as the vertical stabilizer 28 and rudder 30, thus providing enhanced roll, pitch, and yaw control at low airspeeds. This aids in positive control at low airspeed, and at high angles of attack the wing's lift vector moves aft helping to stabilize and slow the aircraft on landing approach.

Figure 2:
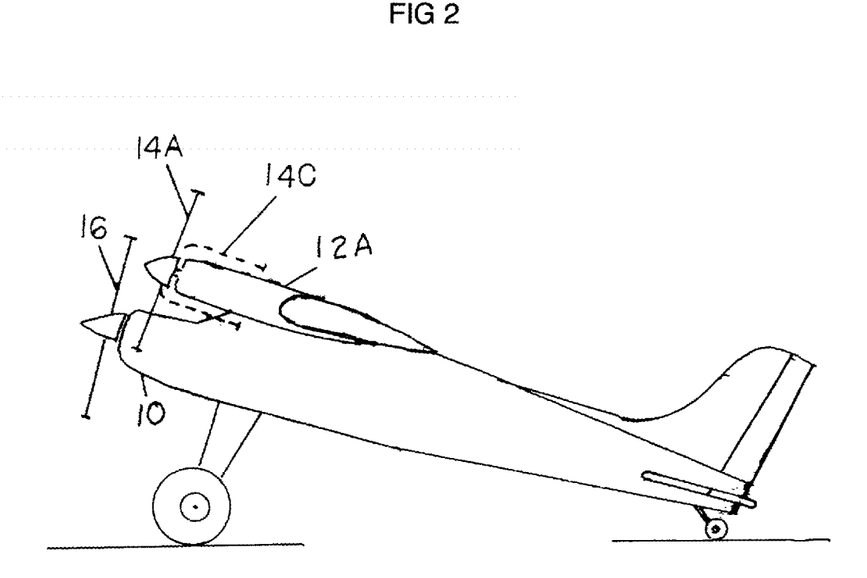
FIG. 2, illustrates a side view of the Full-Segregated Hybrid Propulsion STOL Airplane, and further displays the position of the major components.

FIG. 2, shows a side view of the airplane, with the position of the EM nacelle, 12A, the EM propeller, 14A, and the folded position of the EM propeller, 14C. The ICE, 10 position is shown with the ICE propeller, 16.

FIG. 3, is a block diagram which shows the placement and electrical connections of the major electrical components. Each nacelle is identical, with the exception of the rotation of the EMs, 12 A&B and the counter rotating (if installed) propellers, 14 A&B. The batteries, 42 A&B supply direct current (DC) voltage to the ESCs, 44 A&B which generate, pulsed DC voltage to the EMs as commanded by the ESC control signal, 26 from the AUX 2 channel, 40 of the radio control receiver, 24. This voltage drives the EMs, 12 A&B to the RPM designated by the ESCs control signal. The EMs are mechanically connected by a shaft, 28 A&B to the propellers, 14 A&B. Counter rotation can be achieved by selection of a right and left hand propeller, and changing the direction of rotation by swapping any two of the three wires in the ESC to EM connection until the desired result is obtained.

The ESCs contain within, a Battery Eliminator Circuit (BEC) which provides regulated voltage to the radio control receiver, 24 through the ESC control signal cable, 26. This voltage is distributed through the receiver, 24 to any and all aircraft electrical requirements, excluding the ICE's electronic ignition system, 32, 33, 34, 35, and the payload which is not shown. The two BECs are redundant and one can supply power to all flight controls should the other fail.

The ICE, 10 is selected to fulfill the cruise power requirements, and matched to a propeller, 16 that optimizes efficiency at the planned imaging cruise speed. The RPM of the ICE, 10 and propeller, 16 are controlled by the radio signal transmitted from the computer/transmitter FIG. 4, and received by the antenna, 31 on the receiver. This generates an electrical control signal from the receiver, 24 which controls servo arm position of the throttle servo, 22. The servo arm is mechanically linked to the throttle of the carburetor, 20. The choke, 30 is manually operated on the ground for engine start only. The ignition system, comprising the ignition battery, 33, the ignition module, 32, the ignition switch, 34, and the spark plug and wire, 35 are also shown.

Figure 4:
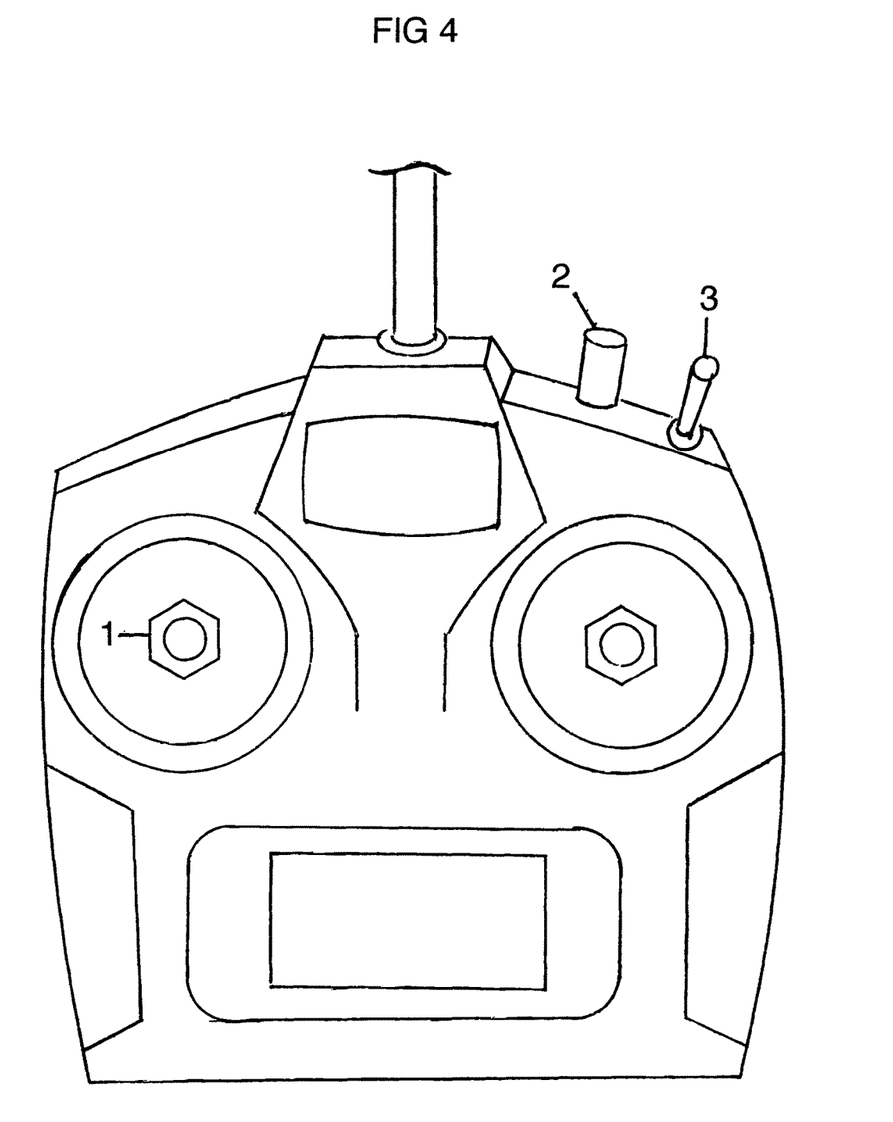
FIG. 4, is a picture of a radio control, computer/transmitter which is representative of the market. This is not claimed as part of the invention and only used to illustrate the operation of the full-segregated thrust hybrid power system for airplanes.

FIG. 4, is a picture of a radio control, computer/transmitter which is representative of the market. This is not claimed in the invention and only used to demonstrate the operation of the full-segregated thrust hybrid propulsion system for airplanes. The radio control computer/transmitter has the capability to mix different channels together, and this capability is utilized in this invention. There are separate controls for the ICE throttle, 1 and the EMs throttle, 2, however a switch, 3 is available, and used to couple or uncouple the ICE and EMs throttle as required to simplify control of the airplane.

OPERATION OF THE INVENTION

This illustrative embodiment of the invention is a small unmanned air vehicle (sUAS), designed to meet the FAA criteria as laid down in the notice of proposed rule making (NPRM) for sUAS vehicles. The FAA NPRM, recently released, defines a sUAS as an aircraft with an Maximum Take Of Weight (MTOW) of less than 55 pounds, a maximum speed of less than 100 miles per hour, to be flown at an altitude of less than 500 feet Above Ground Level (AGL), this is the design criteria. The typical flight profile will be lower than 500 feet to provide, "Low Drape" imaging or sensing, usually averaging 30 meters (96 ft.) above the target area.

Take-off and climb to the survey altitude can be accomplished in less than two minutes with a small percentage of depletion of the available Amp-Hour capacity of the Li-Poly batteries. During the four hour mission, the ESC's built in Battery Eliminator Circuit (BEC) supplies voltage to the aircraft avionics system. There are two BECs, and either one can supply the required power for the avionics. This will however, further deplete the Li-Poly batteries. Flight planning must accommodate this, and allow for sufficient reserves for emergency use of the EMs to facilitate a return to a safe landing area.

The structure of the invention was described above, now we will describe the operation of the invention. The invention primarily concerns the ICE FIG. 3, 10 and EMs FIGS. 3, 12 A&B thrust generation systems, and that will be the focus of this description. For this description, assume the airplane is preflighted and all systems are operational. Also, assume the ICE, FIG. 3, 10 has been started and is idling at normal operating temperature.

Before take off checks are completed to include testing the aircraft controls for proper deflection, and the EMs throttle FIG. 4, 2, on the R/C transmitter is advanced which increases propeller RPM to extend the folding propellers to the flight position. The EMs throttle control is then returned to the idle position, and coupled electronically to the ICE throttle FIG. 4, 1 in the radio control (R/C) transmitter by a switch FIG. 4, 3. The airplane is turned into the wind, if possible, and the airspace is visually checked for any conflict to the take off. Full up elevator is applied and held, and the throttle FIG. 4, 1 is advanced for full thrust. The aircraft will become airborne within a few feet, exactly how many, depends on the take off weight and headwind velocity. Normal flight control application is applied to maintain a nose high attitude until all obstructions are cleared, then if desired, the throttle FIG. 4, 1 may be reduced and normal climb established to the desired cruise altitude. Once cruise altitude and speed are achieved, the EM throttle may be electronically decoupled from the ICE throttle by turning off the switch FIG. 4, 3 on the R/C transmitter and cruise flight continued powered by the ICE only. As the EMs throttle FIG. 4, 2 is closed, each ESC automatically applies a brake to stop propeller rotation and the propellers fold to reduce aerodynamic drag.

The cruise portion of the flight is unremarkable, with the exception that should the ICE fail, the EMs are almost instantly available to supply thrust to recover the aircraft to a safe landing.

Though not mandatory, it is prudent to have the EMs rotating during the approach and landing phase to enhance roll control during the approach and provide additional thrust in the event a missed approach and climb out is required. On the R/C transmitter, the coupling switch FIG. 4, 3 is left off and the EM throttle FIG. 4, 2 is advanced to start the EM propellers rotating. The ICE throttle FIG. 4,1 is used to control the descent to landing. In the event a missed approach is required, the R/C transmitter coupling switch FIG. 4, 3 is turned on, coupling the EMs to the ICE throttle FIG. 4, 1. The ICE throttle FIG. 4, 1 is increased as required and both ICE and EMs respond with greater, or less thrust, as necessary to effect a go around.

If instead of a go around, a landing is made and after the ICE throttle FIG. 4, 1 is closed the EMs throttle FIG. 4, 2 is also closed. The ESC brake will stop rotation of the EMs and propeller, however the propellers require the airflow from forward flight to fold, hence they will remain in the flight position unless contacting grass or weeds that fold them back. While the EMs can be stopped by their throttle FIG. 4, 2 on the R/C transmitter, the ICE must be stopped by turning off the ignition switch FIG. 3, 34.

During flight should the ICE fail for any reason, the EMs can be restarted within seconds, coupled to the in-operable ICE's throttle FIG. 4, 1 by the coupling switch FIG. 4, 3, and the aircraft may be flown to a suitable area and a landing effected.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred illustrative embodiments and examples, but should be given the broadest interpretation consistent with the description as a whole.

The invention claimed is:

1. A segregated thrust hybrid propulsion system for airplanes consisting of an airframe and a segregated thrust hybrid propulsion system mounted on the airframe, comprising:

one, or more, sustainer thrust producers capable of supplying the thrust required for the cruise flight regime; and a plurality of electrically powered augmentation thrust producers disposed in predetermined positions as a means for providing additional thrust to the airplane, and to supplement airflow over the wings and roll control devices of said airplane during the take-off and climb regime, whereby improving the performance envelope of the airplane and enhancing safety;

said electrical powered augmentation thrust producers comprising:

(a) a chemical storage battery, or other electrical power source;

(b) said electrical power source being connected to a speed control device;

(c) said speed control device being connected to an electric motor;

(d) said electric motor being connected to a propeller.

2. The segregated thrust hybrid propulsion system for airplanes in claim 1, when that airplane is a Model Airplane, or an Unmanned Air Vehicle.

3. The segregated thrust hybrid propulsion system for airplanes in claim 1, when that airplane is a certificated manned aircraft.

4. The segregated thrust hybrid propulsion system for airplanes in claim 1, when that airplane is an optionally piloted aircraft.

5. The segregated thrust hybrid propulsion system for airplanes in claim 1, when a previously certificated airplane is modified to a segregated thrust hybrid airplane in accordance with claim 1, by the addition of the electrically powered augmentation thrust producers.

6. The segregated thrust hybrid propulsion system for airplanes in claim 1, when that airplane is a seaplane, flying boat or floatplane.

7. Any airplane when the sustainer thrust producers described in claim 1, are powered by fossil fueled internal combustion engines, fuel cells, or photo-voltaic based thrust producers.

8. The segregated thrust hybrid propulsion system for airplanes in claim 1, when that airplane is a glider, and the sustainer thrust producer is comprised of rising air currents and gravity.

9. The segregated thrust hybrid propulsion system for airplanes in claim 1, when that airplane is an Ultra-Light, or Light Sport Aircraft.

* * * * *